US012698958B2

(12) United States Patent
Fritz-Bouteleux et al.

(10) Patent No.: US 12,698,958 B2
(45) Date of Patent: Aug. 4, 2026

(54) INTERFEROMETER FOR CARRYING OUT AN OPTICAL COHERENCE TOMOGRAPHY

(71) Applicant: Heidelberg Engineering Gmbh, Heidelberg (DE)

(72) Inventors: Andreas Fritz-Bouteleux, Lübeck (DE); Lisa Kutzner, Berlin (DE); Michael Stender, Lübeck (DE)

(73) Assignee: Heidelberg Engineering GmbH, Heidelberg (DE)

( * ) Notice: Subject to any disclaimer, the term of this patent is extended or adjusted under 35 U.S.C. 154(b) by 50 days.

(21) Appl. No.: 18/580,634

(22) PCT Filed: Apr. 29, 2022

(86) PCT No.: PCT/EP2022/061548
§ 371 (c)(1),
(2) Date: Jan. 19, 2024

(87) PCT Pub. No.: WO2023/001419
PCT Pub. Date: Jan. 26, 2023

(65) Prior Publication Data
US 2024/0337480 A1      Oct. 10, 2024

(30) Foreign Application Priority Data

Jul. 19, 2021    (DE) ..................... 10 2021 118 555.6

(51) Int. Cl.
*G01B 9/02091* (2022.01)
*G01B 9/02056* (2022.01)

(52) U.S. Cl.
CPC ..... *G01B 9/02091* (2013.01); *G01B 9/02058* (2013.01); *G01B 2290/70* (2013.01)

(58) Field of Classification Search
CPC ............ G01B 9/02091; G01B 9/02058; G01B 2290/70
See application file for complete search history.

(56) References Cited

U.S. PATENT DOCUMENTS 4,711,525 A * 12/1987 Feth ....................... G02B 6/105
385/11
6,191,862 B1    2/2001 Swanson et al.
(Continued)

FOREIGN PATENT DOCUMENTS

DE      102008016973      10/2009
DE      102020114610      12/2021
(Continued)

OTHER PUBLICATIONS https://focenter.com/blog/polarization-maintaining-fibers-explained (Year: 2021).*

(Continued)

*Primary Examiner* — Michelle M Iacoletti
*Assistant Examiner* — Alexandria Mendoza

(57) ABSTRACT

The invention relates to an interferometer for carrying out an optical coherence tomography. The interferometer has at least one first part (13) and a second part (14) which are arranged or can be arranged in a spatially separated manner, wherein the two parts (13, 14) are optically connected together by at least one optical fiber (8). The aim of the invention is to provide an interferometer comprising parts which are optically connected by at least one fiber and which can be moved relative to each other, said parts and fiber being as insusceptible as possible to polarization changes induced by movement and temperature changes. The invention is characterized in that the optical fiber (8) is designed as a polarizing fiber which prefers the propagation of a first light wave with a set first polarization state or polarization mode and impedes the propagation of second light waves with different polarization states or polarization modes than those of the first light wave.

10 Claims, 5 Drawing Sheets

(56) References Cited

U.S. PATENT DOCUMENTS

| | | | |
|---|---|---|---|
| 10,130,259 B2 * | 11/2018 | Lam ..................... | G02B 6/0288 |
| 2003/0174339 A1 | 9/2003 | Feldchtcin et al. | |
| 2004/0126048 A1 | 7/2004 | Dave et al. | |
| 2007/0237445 A1 | 10/2007 | Hatori | |
| 2013/0202246 A1 | 8/2013 | Meade et al. | |
| 2014/0176960 A1 | 6/2014 | Kemp | |
| 2016/0231101 A1 | 8/2016 | Swanson | |
| 2020/0318944 A1 | 10/2020 | Elmaanaoui et al. | |

FOREIGN PATENT DOCUMENTS

| | | |
|---|---|---|
| JP | 2000-503237 | 3/2000 |
| JP | 2002-535637 | 10/2002 |
| JP | 2007-252475 | 10/2007 |
| JP | 2015-509216 | 3/2015 |
| JP | 2017-067804 | 4/2017 |
| JP | 2020-173254 | 10/2020 |
| WO | WO 97/32182 | 9/1997 |
| WO | WO 00/43730 | 7/2000 |
| WO | WO 2013/115995 | 8/2013 |
| WO | WO 2015/117241 | 8/2015 |
| WO | WO 2019/224270 | 11/2019 |
| WO | WO 2023/001419 | 1/2023 |

OTHER PUBLICATIONS

Wang ("Depth-encoded all-fiber swept source polarization sensitive OCT," Biomed. Opt. Express 5, 2931-2949 (2014)) (Year: 2014).*
Moon ("Fiber-based polarization-sensitive optical coherence tomography of a minimalistic system configuration," Opt. Lett. 44, 3150-3153 (2019)) (Year: 2019).*
Fiber Optic Center (https://focenter.com/blog/polarization-maintaining-fibers-explained—Fiber Optic Center) (Year: 2021).*
Recherchebericht [Examination Report] Dated Mar. 29, 2022 From the Deutsches Patent—und Markenamt [German Patent and Trademark Office] Re. Application No. 102021118555.6. (7 Pages).
Eberlein et al. "PM-Fasern", Lichtwellenleiter-Technik, 10th Ed., p. 178, 2018 & English Translation.
Internationaler Recherchenbericht und Schriftlicher Bescheid [International Searching Authority and the Written Opinion] Dated Aug. 2, 2022 From the International Scarching Authority Re. Application No. PCT/EP2022/061548 and Its Translation of Search Report Into English. (11 Pages).
Yamanari et al. "Optic Axis Determination in SU(2) Jones Formulation", Optical Coherence Tomography and Coherence Domain Optical Methods in Biomedicine XXIII, Proceedings of SPIE, 10867: 108672F-1-108672F-5, Feb. 22, 2019.

* cited by examiner

INTERFEROMETER FOR CARRYING OUT AN OPTICAL COHERENCE TOMOGRAPHY

RELATED APPLICATIONS

This application is a National Phase of PCT Patent Application No. PCT/EP2022/061548 having International filing date of Apr. 29, 2022, which claims the benefit of priority of Germany Patent Application No. 10 2021 118 555.6 filed on Jul. 19, 2021. The contents of the above applications are all incorporated by reference as if fully set forth herein in their entirety.

FIELD AND BACKGROUND OF THE INVENTION

The invention relates to an interferometer according to the preamble of claim 1.

The term optical coherence tomography (typically abbreviated by OCT) is understood as an imaging method. Two-dimensional and three-dimensional images can be obtained from light scattering structures using this method. In this method, light having a certain bandwidth is typically split in a beam splitter into two partial beams. The first partial beam is incident on the sample to be examined, the second partial beam passes through a reference section. The light reflected from the sample interferes with the reference beam.

The sample may be examined with depth resolution, thus in the depth of the optical axis of the first partial beam, by signals from the interference. If the sample is also scanned flatly or laterally using the first partial beam, three-dimensional images of the sample are obtained, so-called OCT images.

Very generally, interferometers for carrying out optical coherence tomography can be divided into two parts movable in relation to one another. If conventional single-mode fibers were used to connect the parts, the bending of the fibers would introduce unpredictable polarization changes into the interferometer. This can be accompanied by significant worsening of the signal-to-noise ratio (SNR) and thus worsened image quality of an OCT image, since sample and reference light can only interfere when they have the same polarization.

SUMMARY OF THE INVENTION

An interferometer of the type described at the outset, namely an OCT interferometer, typically has two interferometer arms, namely the sample arm and the reference arm. Since only light having the same polarization state can interfere, the polarization of the light of the two interferometer arms has to be brought into the same state. Presently, such fiber-based OCT interferometers are constructed using "single-mode fibers".

Insofar as the interferometer is based on the use of single-mode fibers, unpredictable polarization changes are caused within the OCT interferometer by moving or heating of such a fiber, which possibly result in worsening of the signal-to-noise ratio up to an absence of interference. Therefore, interferometers are typically constructed monolithically, i.e., without relative movement of the fibers in relation to one another and with the most constant possible temperature over the entire interferometer. However, in certain situations it is necessary to permit movable parts or temperature gradients, such as a movable sample fiber (mobile handpiece, mounting on the microscope arm, etc.). The exposed parts of the interferometer can be subjected to different temperatures here than the rest of the interferometer.

To counter the above-mentioned effect, the polarization can be actively readjusted in one of the interferometer arms, for which additional hardware and software are required, however. Moreover, this regulation would cause a dead time during the use of the interferometer.

A further possibility to counter or circumvent the mentioned negative polarization effects is to use a polarization-maintaining fiber, for example a so-called "Panda fiber". In this fiber, the light or light waves maintain(s) it or their polarization state over the length of the fiber. However, the light or the light waves run(s) on two different axes, which have a time-of-flight difference (polarization mode dispersion), which is why two interference signals arise. These interference signals can result in image artifacts.

To circumvent the mentioned time-of-flight differences, there is the possibility of splicing two parts of equal length of a polarization-maintaining fiber at a 90° angle on one another, so that each part of the light passes through the fast and slow axis of the fiber in total in the same amount. However, such a fiber assembly is not trivial to construct, since optical crosstalk between the two axes arises with even very minor inaccuracy of the splice angle, which results in side bands in the OCT signal.

In this respect, there is presently no reliable and trivial possibility for constructing multiple parts of an interferometer independent of movement and temperature without having to accept a loss of the signal-to-noise ratio and/or the image quality.

The invention is therefore based on the object of specifying an interferometer having parts which are optically connected by at least one fiber and are movable relative to one another, and the polarization state of which is as independent as possible of the movement and temperature change of the parts and fibers.

The present invention achieves the above-mentioned object by way of the features of claim 1.

First, it has been recognized that there is a need for an OCT interferometer which, upon movement or heating of at least one of its fibers, does not show unpredictable polarization changes of the light waves conducted in these fibers, which possibly result in worsening of the signal-to-noise ratio.

Furthermore, it has been recognized that the interferometer has to be immune to the effects accompanying movement or heating of a fiber, by which an optimum signal-to-noise ratio is substantially always maintained, without influencing the image quality.

The interferometer structure proposed in the scope of the invention separates the interferometer into parts which are essentially independent of one another and are preferably movable relative to one another and connects them using an optical fiber which has special properties, namely extreme birefringence. This birefringence is generated by mechanical tensions which are generated by special structures having various geometries (e.g., bowtie, tiger, elliptical) in the fiber.

According to the invention, in the special fiber used, only linearly polarized light or a light wave can propagate along an axis of the fiber and is thus conducted in a polarization-stable manner through the entire fiber. Light waves having another polarization state or another polarization direction experience significant optical losses and are therefore not or are nearly not passed on by the special fiber. In this case, these are referred to as polarizing fibers.

According to the invention, a possibility is thus created of being able to operate two parts of an OCT interferometer spatially separated from one another, which are connected by a flexible fiber guide, even upon influencing of the fiber or the parts of the interferometer by movement or temperature change, without losing a good signal-to-noise ratio or having to accept image artifacts in this case. Specific parts of the interferometer can thus be made particularly compact as needed. The individual parts of the interferometer can thus be positioned at different locations, only connected by the flexible fiber guide.

If this special fiber is connected between two parts of the interferometer and the polarization of the light to be transmitted is set linearly on the light-guiding axis of the mentioned fiber, the polarization state of a suitably polarized light wave at the outlet of the fiber and thus in the second part of the interferometer is completely independent of movements or temperature changes in this fiber. The signal-to-noise ratio of the OCT image is thus not influenced.

Various OCT interferometer implementations having flexible parts are conceivable:

A first beam splitter could be provided, using which the light of a light source can be split into light of a reference arm and light of a sample arm.

At least one circulator could be provided, by means of which the light of the sample arm can be guided in the direction of a sample and/or by means of which the light of the reference arm can be guided to a reference point and/or a second beam splitter. Signal directions of the light can be separated or set by a circulator. The circulator can be designed as an optical component or optical circuit.

Two polarization setting units could be provided, using each of which the light of the reference arm and the light of the sample arm is convertible or transferable into identically polarized light waves. A first polarization unit can be placed in a single-mode fiber before the special fiber in order to set the arbitrary polarization of the light waves there linearly polarized on the light-guiding axis of the special fiber. The polarization of the light waves of the reference arm is adaptable to the polarization state of the linearly polarized light waves of the sample arm with the aid of the second polarization setting unit, so that the light waves of the two interferometer arms can interfere as completely as possible.

Against this background, a second beam splitter could be provided, in order to bring the light waves of the sample arm and the reference arm into interference. The light waves are brought into interference in only one optical component, namely the second beam splitter. A single detector for detecting an interference signal can thus be connected to the second beam splitter.

A polarization setting unit could be arranged before the special fiber and in the course of a single-mode fiber. The light of the sample arm can thus be guided a certain distance by a single-mode fiber without having to maintain a specific polarization and can first be transferred upon passage through the polarization setting unit into the most linearly polarized possible light wave using a special polarization plane at the input of the special fiber, which is coupled into the light-guiding axis of the special fiber.

The single-mode fiber could pass through a polarization setting unit and be guided from there to a first beam splitter. In this way the light of the sample arm or the reference arm, immediately after its generation by a beam splitter, can be coupled into a single-mode fiber and be conducted from there to a polarization setting unit.

The single-mode fiber could pass through a polarization setting unit and be guided from there to a circulator. Light of the sample arm or the reference arm can thus be conducted, immediately after its generation by a beam splitter, into a circulator. From the circulator, the respective light is introduced into the single-mode fiber and conducted via the single-mode fiber to a polarization setting unit.

The special fiber could be accommodated in a flexible tube cable, which extends between the two parts. A first part can thus be designed as a stationary and larger part, for example having essential parts of the electronics, and the second part can be designed as a smaller part which comprises, for example, a camera head or a handpiece, which can be supplied well to a sample.

DESCRIPTION OF SPECIFIC EMBODIMENTS OF THE INVENTION

Interferometers for carrying out optical coherence tomography are schematically shown in the figures. When reference is made to "single-mode fibers", this means typical single-mode fibers which are called "single-mode fibers" in the English language and are abbreviated by SMF.

Typical light-conducting single-mode fibers (abbreviated by SMF) only conduct components of light beams oriented transversely to the propagation direction.

Various exemplary embodiments of the interferometer configuration having a special fiber 8 in the sample arm 3 are described hereinafter. The principle using the special fiber 8 is explained on the basis of FIG. 1. However, the principle can also be transferred to the other exemplary embodiments according to FIGS. 2 to 5.

Figure 1:
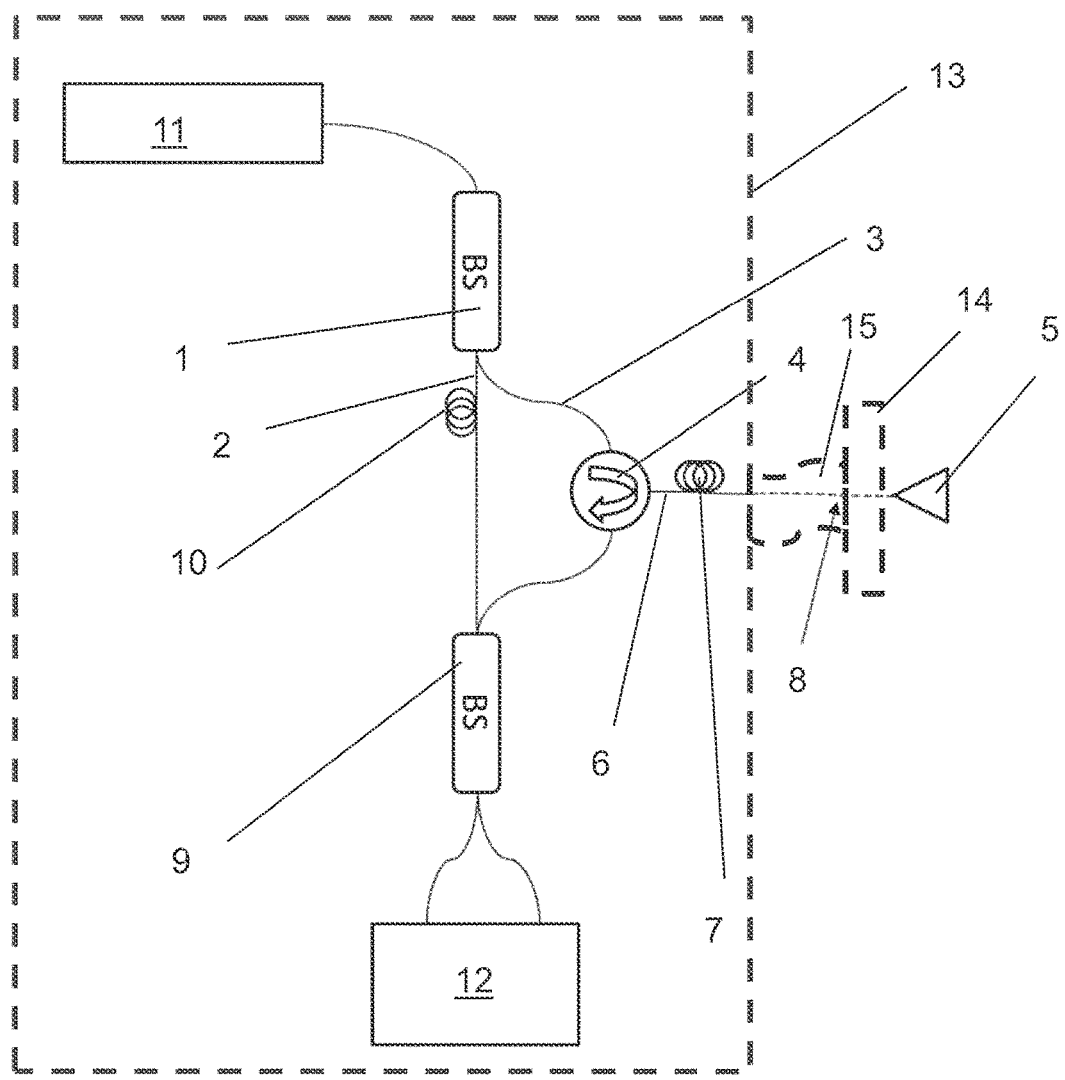
FIG. 1 shows a schematic representation of an interferometer having a reference arm and a sample arm, wherein the light of the sample arm is guided by a circulator to the special fiber.

FIG. 1 schematically shows, restricted to the essential optical arrangement, an interferometer for carrying out optical coherence tomography, wherein the interferometer has at least one first part 13 and one second part 14, which are arranged spatially separated from one another.

The two parts 13, 14 are optically connected to one another by at least one light-conducting fiber 8. The light-conducting fiber 8 is designed as a special polarizing fiber 8, which favors the propagation of a first light wave having a set first polarization state or polarization mode and obstructs the propagation of second light waves having different polarization states or polarization modes in comparison to the first light wave. The special fiber 8 is formed uniformly and is not composed of two fibers.

A first beam splitter 1 is provided, using which the light of a light source 11 can be split into light of a reference arm 2 and light of a sample arm 3. At least one circulator 4 is provided, by means of which the light of the sample arm 3 can be guided in the direction of a sample 5.

The sample 5 itself is not part of the interferometer, but rather is a structure to be examined, for example the tissue of an eye, in particular a human eye.

Two polarization setting units 7, 10 are provided, using each of which the light of the reference arm 2 and the light of the sample arm 3 is convertible or transferable into identically polarized light waves. A second beam splitter 9 is provided, to bring the light waves of the sample arm 3 and the reference arm 2 into interference in order to obtain a signal at a detector 9.

A first polarization setting unit 7 is arranged between the special fiber 8 and a single-mode fiber 6. The single-mode fiber 6 opens at one end into the first polarization setting unit 7 and at its other end into a circulator 4.

The fiber 8 is accommodated in a flexible tube cable 15, which extends between the two parts 13, 14.

FIG. 1 specifically shows that the light of the light source 11 is divided via a first beam splitter 1 into a reference arm 2 and a sample arm 3. The light of the sample arm 3 is conducted with the aid of a circulator 4 in the direction of the sample 5. The light of the sample arm 3 initially passes through a part of the single-mode fiber 6 having the first polarization setting unit 7, in order to set the polarization of the light linearly on the light-guiding axis of the special fiber 8. Only linearly polarized light waves, which oscillate in a specific polarization plane, are thus passed on.

The special fiber 8 now conducts a linearly polarized light wave onto the sample 5 and can be subjected to movements and temperature changes due to its special properties.

This is schematically illustrated in that a first part 13 of the interferometer and a second part 14 of the interferometer are movable relative to one another, wherein the two parts 13, 14 are optically connected to one another, thus in a light-conducting manner, by the special fiber 8. In addition to an optical connection, still further connections can be provided, for example, data or electricity lines as connections.

A light wave takes the same path back from the examined sample 5 to the circulator 4 and is conducted thereby onto a second beam splitter 9, which unifies a light wave of the reference arm 2 and the sample arm 3 with one another and brings them into interference.

Therefore, a second polarization setting unit 10 is placed in the reference arm 2, using which the polarization of the light of the reference arm 2 is set so that a light wave of the reference arm 2 and a light wave of the sample arm 3 interfere with one another and can generate a signal at a detector 12. The two light waves interfering with one another are identically polarized, namely oscillate in the same polarization plane. The detector 12 is a so-called "balanced detector".

Figure 2:
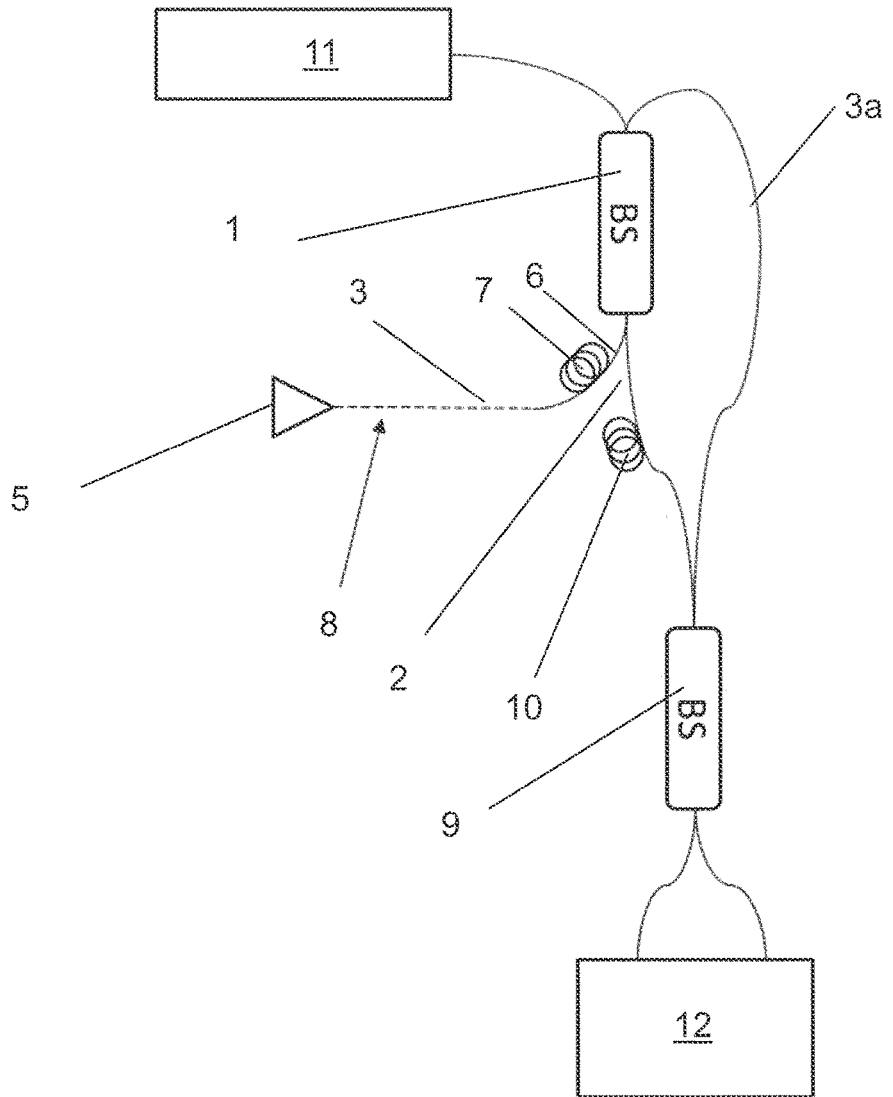
FIG. 2 shows a schematic representation of an interferometer having a reference arm and a sample arm, wherein the light of the sample arm is guided by a beam splitter/fiber coupler to the special fiber.

FIG. 2 shows on the basis of a further embodiment that the light of the light source 11 is divided via a first beam splitter 1 into a reference arm 2 and a sample arm 3. The light of the sample arm 3 is conducted, without a circulator 4 according to FIG. 1, in the direction of the sample 5. The light of the sample arm 3 initially passes through a part of the single-mode fiber 6 having the first polarization setting unit 7, in order to set the polarization of the light linearly on the light-guiding axis of the special fiber 8.

The special fiber 8, which adjoins the first polarization setting unit 7, now conducts a specially linearly polarized light wave through the special fiber 8 onto the sample 5 and can be subjected to movements and temperature changes due to its special properties.

The light wave takes the same path back from the sample 5 to the first beam splitter 1 and is conducted thereby via a bypass line 3a, which is not identical to the special fiber 8, onto a second beam splitter 9, which unifies the light waves of the reference arm 2 and the sample arm 3 with one another and brings them into interference.

Therefore, a second polarization setting unit 10 is placed in the reference arm 2, using which the polarization of the light of the reference arm 2 is set so that a linearly polarized light wave of the reference arm 2 and a light wave of the sample arm 3 interfere with one another and can generate a signal at a detector 12. The two light waves interfering with one another are identically polarized, namely oscillate in the same polarization plane. The detector 12 is a so-called "balanced detector".

Figure 3:
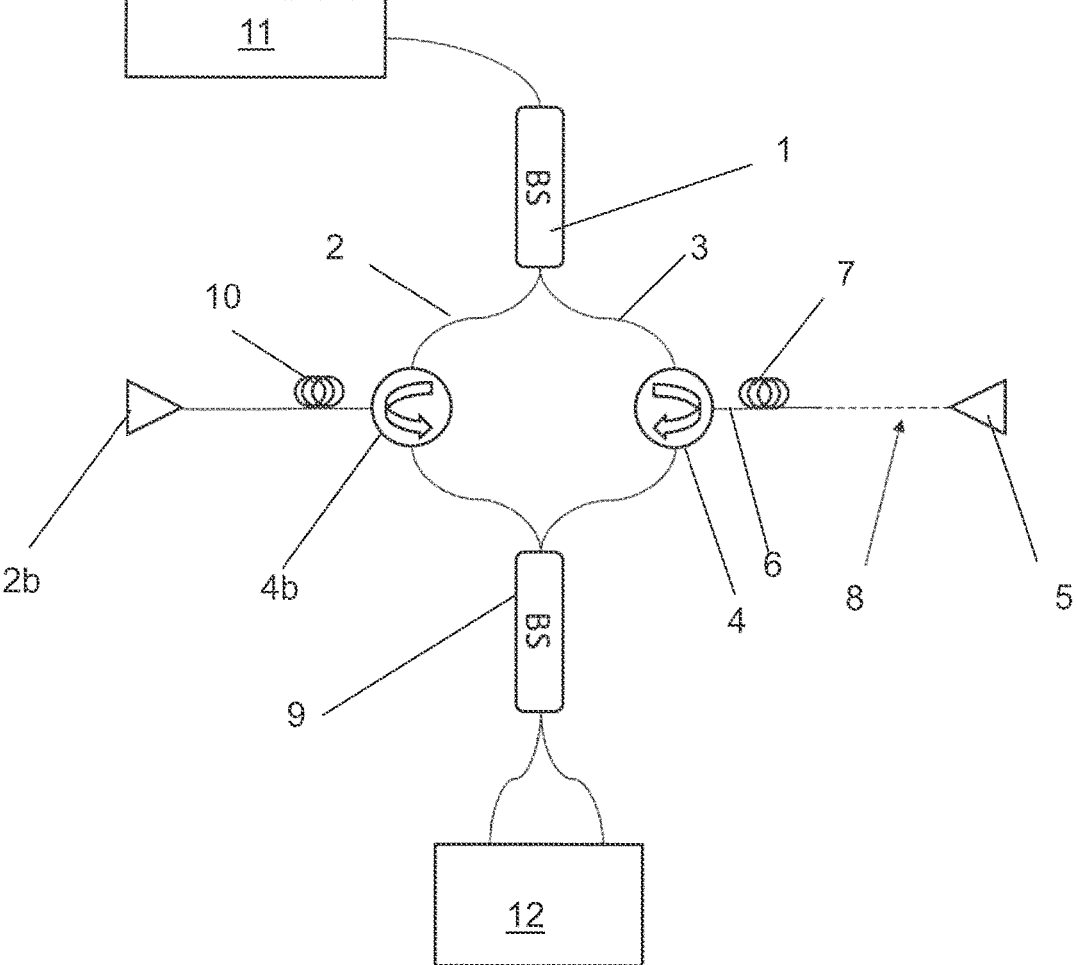
FIG. 3 shows a schematic representation of an interferometer having a reference arm and a sample arm, wherein the light of the sample arm is guided by a circulator to the special fiber and wherein the light of the reference arm is guided by a circulator to a reference mirror.

FIG. 3 shows that the light of the light source 11 is divided via a first beam splitter 1 into a reference arm 2 and a sample arm 3. The light of the sample arm 3 is conducted with the aid of a circulator 4 in the direction of the sample 5. The light of the sample arm 3 initially passes through a part of the single-mode fiber 6 having the first polarization setting unit 7, in order to set the polarization of the light linearly on the light-guiding axis of the special fiber 8.

The special fiber 8, which adjoins the first polarization setting unit 7, now conducts a linearly polarized light wave onto the sample 5 and can be subjected to movements and temperature changes due to its special properties.

The linearly polarized light wave takes the same path back from the sample 5 to the circulator 4 and is conducted thereby onto a second beam splitter 9, which unifies the identically linearly polarized light waves of the reference arm 2 and the sample arm 3 with one another.

A second polarization setting unit 10 is placed in the reference arm 2 for this purpose, using which the polarization of a light wave of the reference arm 2 is set so that the light waves of the reference arm 2 and the sample arm 3 interfere with one another and can generate a signal at a detector 12. The two light waves interfering with one another are identically polarized, namely oscillate in the same polarization plane. The detector 12 is a so-called "balanced detector".

The light of the reference arm 2 is conducted by a second circulator 4b in the direction of the second polarization setting unit 10, from which a linearly polarized light wave reaches a reference point 2b.

From the reference point 2b, the light wave of the reference arm 2 runs back through the second polarization setting unit 10 and then through the second circulator 4b to the second beam splitter 9, where it can interfere with an identically polarized light wave of the sample arm 3 and generate a signal at the detector 12.

Figure 4:
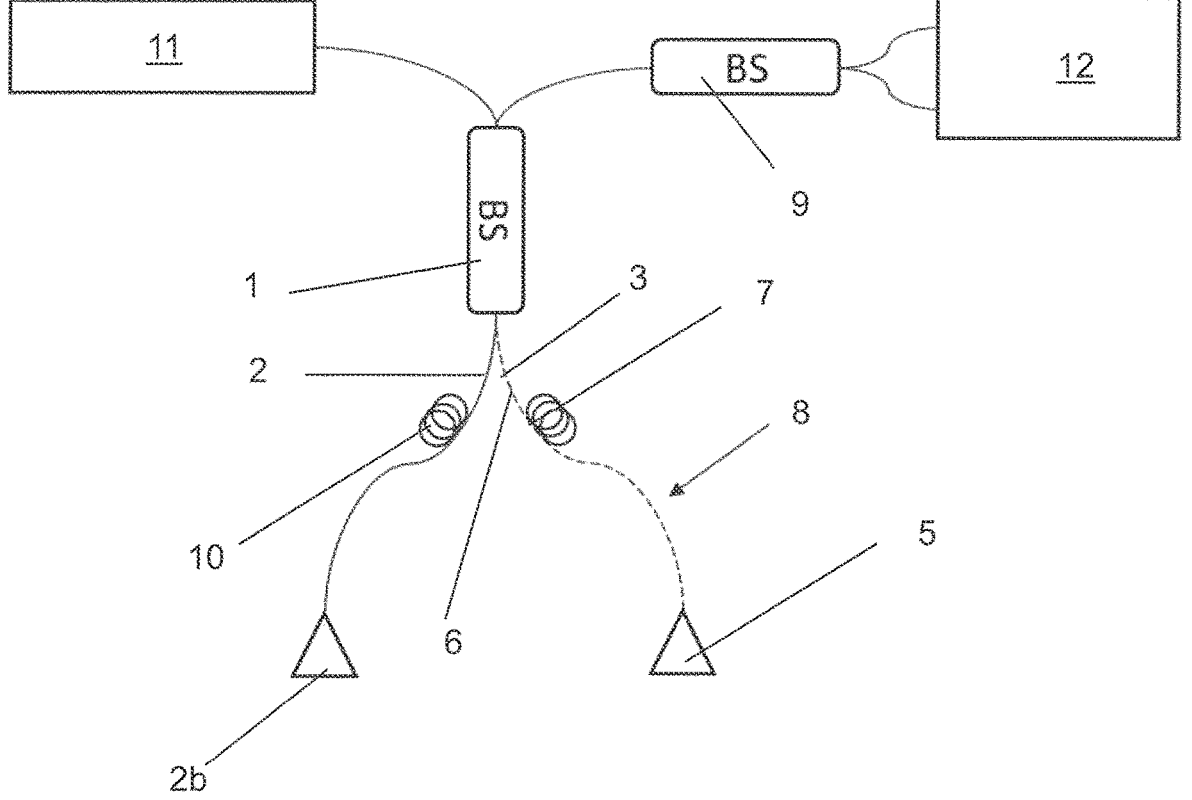
FIG. 4 shows a schematic representation of an interferometer having a reference arm and a sample arm, wherein the light of the sample arm is guided by a beam splitter/fiber coupler to the special fiber, wherein the light of the reference arm is guided to a reference mirror by the same beam splitter/fiber coupler.

FIG. 4 shows that the light of the light source 11 is divided via a first beam splitter 1 into a reference arm 2 and a sample arm 3. The light of the sample arm 3 is conducted with a circulator 4 in the direction of the sample 5. The light of the sample arm 3 initially passes through a part 6 of the single-mode fiber having the first polarization setting unit 7, in order to set the polarization of the light linearly on the light-guiding axis of the special fiber 8.

The special fiber 8, which adjoins the first polarization setting unit 7, now conducts a specially linearly polarized light wave onto the sample 5 and can be subjected to movements and temperature changes due to its special properties.

The specially linearly polarized light wave takes the same path back from the sample 5 to the first beam splitter 1 and is conducted thereby onto a second beam splitter 9, which unifies the identically polarized light waves of the reference arm 2 and the sample arm 3 with one another.

A second polarization setting unit 10 is placed in the reference arm 2 for this purpose, using which the polarization of the light of the reference arm 2 is set so that the light waves of the reference arm 2 and the sample arm 3 interfere with one another and can generate a signal at a detector 12. The two light waves interfering with one another are identically polarized, namely oscillate in the same polarization plane. The detector 12 is a so-called "balanced detector".

The light of the reference arm 2 is conducted for this purpose by the first beam splitter 1 in the direction of a second polarization setting unit 10, from which a linearly polarized light wave reaches a reference point 2b. From the reference point 2b, this light wave of the reference arm 2 runs back through the second polarization setting unit 10 and then through the first beam splitter 1 to the second beam splitter 9, where it can interfere with the linearly polarized light wave of the sample arm 3 and generate a signal at the detector 12. The detector 12 is arranged behind the second beam splitter 9.

Figure 5:
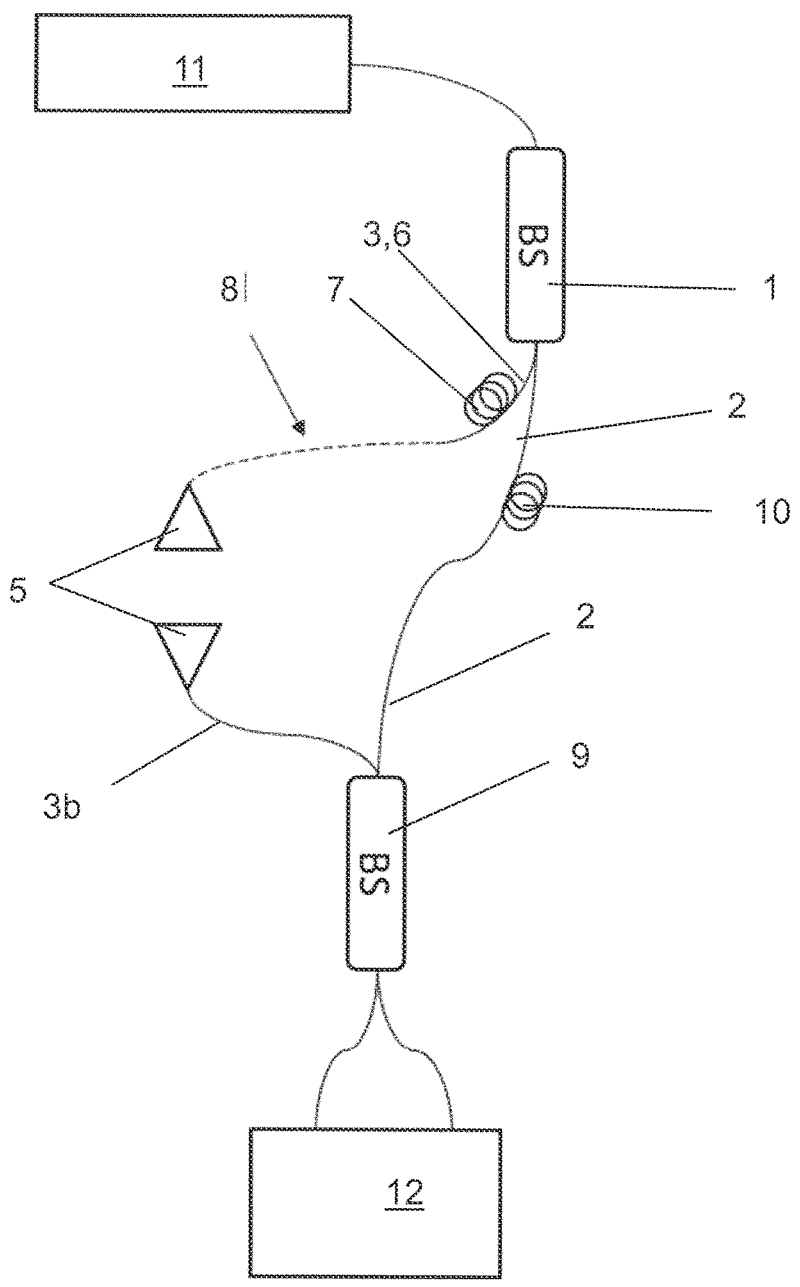
FIG. 5 shows a schematic representation of an interferometer having a reference arm and a sample arm, wherein the light of the sample arm is guided by a beam splitter/fiber coupler to the special fiber onto a sample and is guided from the sample directly to a second beam splitter.

FIG. 5 shows that the light of the light source 11 is divided via a first beam splitter 1 into a reference arm 2 and a sample arm 3. The light of the sample arm 3 is conducted without a circulator 4 in the direction of the sample 5.

The light of the sample arm 3 initially passes through a part of the single-mode fiber 6 having the first polarization setting unit 7, in order to set the polarization of the light linearly on the light-guiding axis of the special fiber 8.

The special fiber 8, which adjoins the first polarization setting unit 7, now conducts a specially linearly polarized light wave onto the sample 5 and can be subjected to movements and temperature changes due to its special properties.

The linearly specially polarized light wave takes a path from the sample 5 via a further line 3b, which is not identical to the special line 8, up to a second beam splitter 9, which unifies the linearly identically polarized light waves of the reference arm 2 and the sample arm 3 with one another.

A second polarization setting unit 10 is placed in the reference arm 2 for this purpose, using which the polarization of the light of the reference arm 2 is set so that the light waves of the reference arm 2 and the sample arm 3 interfere with one another and can generate a signal at a detector 12. The two light waves interfering with one another are identically polarized, namely oscillate in the same polarization plane. The detector 12 is a so-called "balanced detector".

The light of the reference arm 2 is conducted for this purpose by the first beam splitter 1 in the direction of the second polarization setting unit 10. From the second polarization setting unit 10, a linearly specially polarized light wave of the reference arm 2 reaches the second beam splitter 9, where it can interfere with the light wave of the sample arm 3, which is identically linearly polarized thereto and is fed via the further line 3b, and generate a signal at the detector 12. The detector 12 is arranged behind the second beam splitter 9.

LIST OF REFERENCE SIGNS

1 first beam splitter
2 reference arm
2b reference mirror
3 sample arm
3a bypass line of 3
3b further line of 3
4 circulator
4b second circulator
5 sample
6 single-mode fiber
7 first polarization setting unit
8 special fiber
9 second beam splitter
10 second polarization setting unit
11 light source
12 detector
13 first part of an OCT interferometer
14 second part of an OCT interferometer
15 tube cable

The invention claimed is:

1. An interferometer for carrying out optical coherence tomography, wherein the interferometer has at least one first part and one second part, which are spatially separate from one another, and wherein the first part and the second part are movable relative to one another, and wherein the two parts are optically connected to one another by at least one light-conducting fiber, wherein the connecting light-conducting fiber is designed as a polarizing fiber, which favors the propagation of a specific polarization state or polarization mode and obstructs or suppresses the propagation of other polarization states or polarization modes;

wherein a first beam splitter is provided, with which the light of a light source is split into light of a reference arm and light of the sample arm;

wherein two polarization setting units are provided, with which the light of the reference arm and the light of the sample arm is each converted or transformed into identically polarized light waves, wherein a first polarization setting unit is inserted before the polarizing fiber and in the course of a single-mode fiber of the sample arm, and wherein a second polarization setting unit is placed in the reference arm.

2. The interferometer as claimed in claim 1, wherein the polarizing fiber is designed having a bow-tie structure generating birefringence.

3. The interferometer as claimed in claim 1, wherein the polarizing fiber is designed having a tiger structure generating birefringence.

4. The interferometer as claimed in claim 1, wherein the polarizing fiber is designed having an elliptical structure generating birefringence.

5. The interferometer as claimed in claim 1, wherein the polarizing fiber is designed having a Panda structure generating birefringence.

6. The interferometer as claimed in claim 1, wherein at least one circulator is provided, by means of which the light of the sample arm can be guided in the direction of a sample and/or by means of which the light of the reference arm can be guided to a reference point and/or a second beam splitter.

7. The interferometer as claimed in claim 1, wherein a second beam splitter is provided to bring the light waves of the sample arm and the reference arm into interference.

8. The interferometer as claimed in claim 1, wherein the single-mode fiber terminates at one end in the polarizing fiber and at its other end in the first beam splitter.

9. The interferometer as claimed in claim 1, wherein the single-mode fiber terminates at one end in the polarizing fiber and at its other end into a circulator.

10. The interferometer as claimed in claim 1, wherein the fiber is accommodated in a flexible tube cable, which extends between the two parts.

* * * * *